(12) United States Patent
Tsukuda et al.

(10) Patent No.: US 6,207,314 B1
(45) Date of Patent: Mar. 27, 2001

(54) BASE MATERIAL FOR A FUEL BATTERY

(75) Inventors: Hiroshi Tsukuda; Toshiro Nishi; Nagao Hisatome; Toru Houjyou, all of Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/186,134

(22) Filed: Nov. 4, 1998

(30) Foreign Application Priority Data

Nov. 7, 1997 (JP) .................................................. 9-305954

(51) Int. Cl.$^7$ ...................................................... H01M 4/86
(52) U.S. Cl. .................................................. 429/44; 429/45
(58) Field of Search .......................................... 429/44, 45

(56) References Cited

U.S. PATENT DOCUMENTS

| 5,122,425 | 6/1992 | Yoshida et al. | 429/33 |
| 5,217,822 | 6/1993 | Yoshida et al. | 429/33 |

FOREIGN PATENT DOCUMENTS

| 0 481 679 | 4/1992 | (EP) . |
| 0 495 583 | 7/1992 | (EP) . |
| 0 594 048 | 4/1994 | (EP) . |
| 4-338180 | 11/1992 | (JP) . |
| 5-151982 | * 6/1993 | (JP) . |
| 5-225986 | * 9/1993 | (JP) . |
| 6-295730 | 10/1994 | (JP) . |
| 7-211335 | * 8/1995 | (JP) . |
| 7-240214 | * 12/1995 | (JP) . |
| 8-250138 | * 9/1996 | (JP) . |
| 9-274921 | * 10/1997 | (JP) . |

OTHER PUBLICATIONS

Patent Abstracts of Japan, vol. 013, No. 243 (E–768), Jun. 1989—JP 01 045059 A, Mitsubishi Heavy Industries Ltd., Feb. 17, 1989.

* cited by examiner

Primary Examiner—Laura Weiner
(74) Attorney, Agent, or Firm—Anderson, Kill & Olick P.C.

(57) ABSTRACT

A material for a base tube of a fuel battery, comprising a mixture of at least two components selected from the group consisting CaO, $ZrO_2$, NiO, MgO, SrO, $Al_2O_3$, $TiO_2$, and BaO. Such material suppresses cracks of an electrolyte and also suppress leakage after rapid temperature increase and decrease, thus providing a reliable fuel battery.

4 Claims, 1 Drawing Sheet

BASE MATERIAL FOR A FUEL BATTERY

FIELD OF THE INVENTION

This invention relates to a base material for a fuel battery.

BACKGROUND OF THE INVENTION

An example of a conventionally used technique is shown in FIG. 1. A base tube (base material portion) 1 according to prior art comprises a porous tube composed of 30.0 wt. % of CaO and 70.0 wt. % of $ZrO_2$. On the surface of the base tube (base material portion) 1, there are laminated a 100 μm thick fuel electrode-side electrode 2 comprising Ni-zirconia thermit, a 100 μm thick electrolyte 3 comprising yttrium-stabilized zirconia ("YSZ"), and a 100 μm thick air-side electrode 4 comprising $LaMnO_3$ doped with Sr in a proportion of 0.1. Further, a conductive connecting material 5 comprising $LaCrO_3$ is laminated for connecting the fuel electrode-side electrode 2 with the air-side electrode 4 to form a solid oxide fuel cell ("SOFC"); hereinafter referred to as "a fuel cell"; multiple fuel cells are connected to form a device hereinafter referred to as a "fuel battery".

However, the base tube according to the earlier technology poses the problem of degrading markedly at a fast temperature raising and lowering rates during a heat cycle. In detail, with a temperature raising and lowering rate of not higher than 50° C./hour, the performance of the cell after the heat cycle does not differ from its performance before the heat cycle. At a temperature raising and lowering rate in excess of 50° C./hour, on the other hand, an output drop of about 10% may occur per heat cycle. When fuel cells are used as a gathering, a temperature raising and lowering rate, if not made very slow, exceeds 50° C./hour in a part of the fuel cell gathering, thereby damaging the cell. Thus, there is a demand for a cell which is not damaged even at a high temperature raising and lowering rate of about 200° C./hour.

SUMMARY OF THE INVENTION

Figure 1:
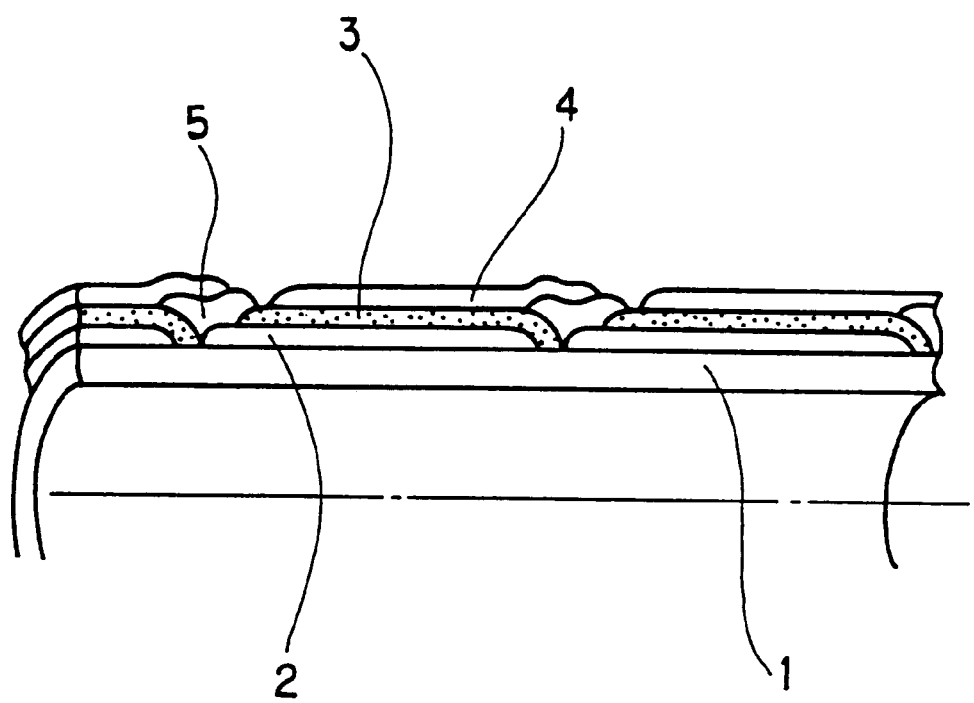
FIG. 1 is a sectional view of a base tube of a solid electrolyte fuel battery.

In order to meet such demand for a fuel cell, the material for constructing the porous base tube of the fuel cell has been changed from the prior art material comprising 30.0 wt. % CaO and 70.0 wt. % $ZrO_2$.

It has been found that porous base tubes comprised of the materials described below will permit the fuel cell to operate at heat cycles entailing rapid rates of temperature increase and decrease without any significant reduction in output.

DETAILS OF THE INVENTION

In its broadest sense, the material employed for the porous base tube of a fuel battery comprising a mixture of at least two components selected from the group consisting of CaO, $ZrO_2$, NiO, MgO, SrO, $Al_2O_3$, $TiO_2$ and BaO.

A first aspect of the invention based on the above finding is a material for a base tube of a fuel battery, comprising a three-component mixture composed of CaO$\leq$26.1 wt. %, $ZrO_2\leq$60.9 wt. % and 13.0 wt. %$\leq$NiO.

A second aspect of the invention is the material for a base tube of a fuel battery of the first aspect, wherein the NiO is present in the form of particles having a particle size of 5 μm or less.

A third aspect of the invention is a material for a base tube of a fuel battery, comprising a three-component mixture composed of CaO$\leq$27.2 wt. %, $ZrO_2\leq$63.6 wt. % and 9.2 wt. %$\leq$MgO.

A fourth aspect of the invention is a material for a base tube of a fuel battery, comprising a three-component mixture composed of CaO$\leq$27.4 wt. %, $ZrO_2\leq$63.9 wt. % and 8.7 wt. %$\leq$SrO.

A fifth aspect of the invention is a material for a base tube of a fuel battery, comprising a two-component mixture composed of 47.9 wt. %$\leq$MgO and $Al_2O_3\leq$52.1 wt. %.

A sixth aspect of the invention is a material for a base tube of a fuel battery, comprising a three-component mixture composed of 22.8 wt. %$\leq$CaO, MgO$\leq$21.9 wt. % and $Al_2O_3\leq$55.3 wt. %.

A seventh aspect of the invention is a material for a base tube of a fuel battery, comprising a three-component mixture composed of MgO$\leq$20.9 wt. %, 26.3 wt. %$\leq$SrO and $Al_2O_3\leq$52.8 wt. %.

An eighth aspect of the invention is a material for a base tube of a fuel battery, comprising a four-component mixture composed of 17.7 wt. %$\leq$CaO, MgO$\leq$16.2 wt. %, $Al_2O_3\leq$40.9 wt. % and 25.2 wt. %$\leq TiO_2$.

A ninth aspect of the invention is a material for a base tube of a fuel battery, comprising a four-component mixture composed of MgO$\leq$13.3 wt. %, 30.1 wt. %$\leq$SrO, $Al_2O_3\leq$33.4 wt. % and 23.2 wt. %$\leq TiO_2$.

A tenth aspect of the invention is a material for a base tube of a fuel battery, comprising a four-component mixture composed of MgO$\leq$14.2 wt. %, $Al_2O_3\leq$36.2 wt. %, 17.0 wt. %$\leq TiO_2$ and 32.6 wt. %$\leq$BaO.

DETAILED DESCRIPTION OF THE PREFERRED EMBODIMENTS (1) The first aspect of the invention is a material for a base tube of a fuel battery, comprising a three-component mixture composed of CaO$\leq$26.1 wt. %, $ZrO_2\leq$60.9 wt. % and 13.0 wt. %$\leq$NiO.

Preferably, as shown in Examples to be offered later on, the three-component mixture is selected from the ranges 26.1 wt. %$\geq$CaO$\geq$9.1 wt. %, 60.9 wt. %$\geq ZrO_2\geq$20.9 wt. %, and 13.0 wt. %$\leq$NiO$\leq$70.0 wt. %, more preferably, the ranges 21.0 wt. %$\geq$CaO$\geq$9.1 wt. %, 49.0 wt. %$\geq ZrO_2\geq$20.9 wt. %, and 30.0 wt. %$\leq$NiO$\leq$70.0 wt. %, and most preferably, the ranges 14.9 wt. %$\geq$CaO$\geq$9.1 wt. %, 34.8 wt. %$\geq ZrO_2\geq$20.9 wt. %, and 50.3 wt. %$\leq$NiO$\leq$70.0 wt. %. If the three-component mixture exceeds these ranges, the temperature raising and lowering rate cannot be changed to a rapid rate. With a higher content of the Ni component, electrical conductivity occurs, and performance of a fuel battery is not obtained. Here, the change in the temperature raising and lowering rate to a rapid rate refers to a change to a temperature raising and lowering rate exceeding 50° C./hour (the same will hold true hereinbelow)

(2) The second aspect of the invention is the constitution of the first aspect, wherein the NiO is present in the form of particles having a particle size of 5 μm or less. If the particle size of NiO exceeds 5 μm, the amount of steam added when natural gas is used as a fuel cannot be decreased. This is not preferred for improvement of efficiency.

(3) The third aspect of the invention is a material for a base tube of a fuel battery, comprising a three-component mixture composed of CaO$\leq$27.2 wt. %, $ZrO_2\leq$63.6 wt. % and 9.2 wt. %$\leq$MgO.

Preferably, as shown in the Examples to be offered later on, the three-component mixture is selected from the ranges 27.2 wt. %$\geq$CaO$\geq$0.5 wt. %, 63.6 wt. %$\geq ZrO_2\geq$0.5 wt. %, and 9.2 wt. %$\leq$MgO$\leq$99 wt. %, more preferably, the ranges 22.9 wt. %$\geq$CaO$\geq$0.5 wt. %, 53.5 wt. %$\geq ZrO_2\geq$0.5 wt. %, and 23.6 wt. %≦MgO≦99 wt. %, and most preferably, the ranges 16.2 wt. %≧CaO≧0.5 wt. %, 37.9 wt. %≧ZrO₂≧0.5 wt. %, and 43.9 wt. %≦MgO≦99 wt. %. If the three-component mixture exceeds these ranges, the temperature raising and lowering rate cannot be made rapid.

(4) The fourth aspect of the invention is a material for a base tube of a fuel battery, comprising a three-component mixture composed of CaO≦27.4 wt. %, ZrO₂≦63.9 wt. % and 8.7 wt. %≦SrO.

Preferably, as shown in the Examples to be offered later on, the three-component mixture is selected from the ranges 27.4 wt. %≧CaO≧0.5 wt. %, 63.9 wt. %≧ZrO₂≧0.5 wt. %, and 8.7 wt. %≦SrO≦99 wt. %, more preferably, the ranges 23.6 wt. %≧CaO≧0.5 wt. %, 55.1 wt. %≧ZrO₂≧0.5 wt. %, and 21.3 wt. %≦SrO≦99 wt. %, and most preferably, the ranges 18.6 wt. %≧CaO≧0.5 wt. %, 43.4 wt. %≧ZrO₂≧0.5 wt. %, and 38.0 wt. %≦SrO≦99 wt. %. If the three-component mixture exceeds these ranges, the temperature raising and lowering rate cannot be made rapid. Increased purity also leads to a higher cost, making production of an inexpensive fuel battery impossible.

(5) The fifth aspect of the invention is a material for a base tube of a fuel battery, comprising a two-component mixture composed of 47.9 wt. %≦MgO and Al₂O₃≦52.1 wt. %.

Preferably, as shown in the Examples to be offered later on, the two-component mixture is selected from the ranges 47.9 wt. %≦MgO≦99.5 wt. % and 52.1 wt. %≧Al₂O₃≧0.5 wt. %, more preferably, the ranges 59.3 wt. %≦MgO≦99.5 wt. % and 40.7 wt. %≧Al₂O₃≧0.5 wt. %, most preferably, the ranges 73.9 wt. %≦MgO≦99.5 wt. % and 26.1 wt. %≧Al₂O₃≧0.5 wt. %. If the two-component mixture exceeds these ranges, the temperature raising and lowering rate cannot be made rapid. Increased purity also leads to a higher cost, making production of an inexpensive fuel battery impossible.

(6) The sixth aspect of the invention is a material for a base tube of a fuel battery, comprising a three-component mixture composed of 22.8 wt. %≦CaO, MgO≦21.9 wt. % and Al₂O₃≦55.3 wt. %.

Preferably, the three-component mixture is selected from the ranges 22.8 wt. %≦CaO≦99.0 wt. %, 21.9 wt. %≧MgO≧0.5 wt. %, and 55.3 wt. %≧Al₂O₃≧0.5 wt. %, more preferably, the ranges 36.5 wt. %≦CaO≦99.0 wt. %, 18.0 wt. %≧MgO≧0.5 wt. %, and 45.5 wt. %≧Al₂O₃≧0.5 wt. %, and most preferably, the ranges 54.4 wt. %≦CaO≦99.0 wt. %, 12.9 wt. %≧MgO≧0.5 wt. %, and 32.7 wt. %≧Al₂O₃≧0.5 wt. %. If the three-component mixture exceeds these ranges, the temperature raising and lowering rate cannot be made rapid. Increased purity also leads to a higher cost, making production of an inexpensive fuel battery impossible.

(7) The seventh aspect of the invention is a material for a base tube of a fuel battery, comprising a three-component mixture composed of MgO≦20.9 wt. %, 26.3 wt. %≦SrO and Al₂O₃≦52.8 wt. %.

Preferably, the three-component mixture is selected from the ranges 20.9 wt. %≧MgO≧0.5 wt. %, 26.3 wt. %≦SrO≦99.0 wt. %, and 52.8 wt. %≧Al₂O₃≧0.5 wt. %, more preferably, the ranges 17.0 wt. %≧MgO≧0.5 wt. %, 39.9 wt. %≦SrO≦99.0 wt. %, and 43.1 wt. %≧Al₂O₃≧0.5 wt. %, and most preferably, the ranges 12.5 wt. %≧MgO≧0.5 wt. %, 55.8 wt. %≦SrO≦99.0 wt. %, and 31.7 wt. %≧Al₂O₃≧0.5 wt. %. If the three-component mixture exceeds these ranges, the temperature raising and lowering rate cannot be made rapid. Increased purity also leads to a higher cost, making production of an inexpensive fuel battery impossible.

(8) The eighth aspect of the invention is a material for a base tube of a fuel battery, comprising a four-component mixture composed of 17.7 wt. %≦CaO, MgO≦16.2 wt. %, Al₂O₃≦40.9 wt. % and 25.2 wt. %≦TiO₂.

Preferably, the four-component mixture is selected from the ranges 17.7 wt. %≦CaO≦40.8 wt. %, 16.2 wt. %≧MgO≧0.5 wt. %, 40.9 wt. %≧Al₂O₃≧0.5 wt. % and 25.2 wt. %≦TiO₂≦58.2 wt. %, more preferably, the ranges 27.3 wt. %≦CaO≦40.8 wt. %, 9.6 wt. %≧MgO≧0.5 wt. %, 24.3 wt. %≧Al₂O₃≧0.5 wt. % and 38.8 wt. %≦TiO₂≦58.2 wt. %, and most preferably, the ranges 38.8 wt. %≦CaO≦40.8 wt. %, 1.6 wt. %≧MgO≧0.5 wt. %, 4.3 wt. %≧Al₂O₃≧0.5 wt. % and 55.3 wt. %≦TiO₂≦58.2 wt. %. If the four-component mixture exceeds these ranges, the temperature raising and lowering rate cannot be made rapid. Increased purity also leads to a higher cost, making production of an inexpensive fuel battery impossible.

(9) The ninth aspect of the invention is a material for a base tube of a fuel battery, comprising a four-component mixture composed of MgO≦13.3 wt. %, 30.1 wt. %≦SrO, Al₂O₃≦33.4 wt. % and 23.2 wt. %≦TiO₂.

Preferably, the four-component mixture is selected from the ranges 13.3 wt. %≧MgO≧0.5 wt. %, 30.1 wt. %≦SrO≦55.9 wt. %, 33.4 wt. %≧Al₂O₃≧0.5 wt. % and 23.2 wt. %≦TiO₂≦43.1 wt. %, more preferably, the ranges 6.5 wt. %≧MgO≧0.5 wt. %, 43.6 wt. %≦SrO≦55.9 wt. %, 16.3 wt. %≧Al₂O₃≧0.5 wt. % and 33.6 wt. %≦TiO₂≦43.1 wt. %. If the four-component mixture exceeds these ranges, the temperature raising and lowering rate cannot be made rapid. Increased purity also leads to a higher cost, making production of an inexpensive fuel battery impossible.

(10) The tenth aspect of the invention is a material for a base tube of a fuel battery, comprising a four-component mixture composed of MgO≦14.2 wt. %, Al₂O₃≦36.2 wt. %, 17.0 wt. %≦TiO₂ and 32.6 wt. %≦BaO.

Preferably, the four-component mixture is selected from the ranges 14.2 wt. %≧MgO≧0.5 wt. %, 36.2 wt. %≧Al₂O₃≧0.5 wt. %, 17.0 wt. %≦TiO₂≦65.8 wt. % and 32.6 wt. %≦BaO≦33.2 wt. %, more preferably, the ranges 8.3 wt. %≧MgO≧0.5 wt. %, 21.1 wt. %≧Al₂O₃≧0.5 wt. %, 24.2 wt. %≦TiO₂≦65.8 wt. % and 46.4 wt. %≧BaO≧33.2 wt. %, and most preferably, the ranges 2.2 wt. %≧MgO≧0.5 wt. %, 5.8 wt. %≧Al₂O₃≧0.5 wt. %, 31.5 wt. %≦TiO₂≦65.8 wt. % and 60.5 wt. %≧BaO≧33.2 wt. %. If the four-component mixture exceeds these ranges, the temperature raising and lowering rate cannot be made rapid. Increased purity also leads to a higher cost, making production of an inexpensive fuel battery impossible.

The present invention will be described in detail with reference to Examples, which in no way limit the invention.

EXAMPLE 1

A base tube comprising a composite material having a CaO—ZrO₂—NiO three-component mixture.

Example 1-1

FIG. 1 shows an example in which a base tube (base material portion) 1 was formed from a porous tube comprising a composite material having a composition (1) indicated in Table 1.

On the surface of the base tube 1, there were laminated a 100 μm thick fuel electrode-side electrode 2 comprising Ni-zirconia thermit, a 100 μm thick electrolyte 3 comprising YSZ, and a 100 μm thick air-side electrode 4 comprising LaMnO₃ doped with Sr in a proportion of 0.1. Further, a conductive connecting material 5 comprising LaCrO₃ was laminated for connecting the fuel electrode-side electrode 2 with the air-side electrode 4 to form a fuel cell, and the fuel cells were connected together to make a fuel battery.

The rapid temperature raising and lowering of the fuel battery was repeated, and then changes in its leak were compared. The results are shown in Table 1. A fuel battery having the base tube composition CaO:30.0 wt. %/$ZrO_2$:70.0 wt. % according to the earlier technology was used as a control.

In this Example, the repetition of rapid temperature raising and lowering refers concretely to raising and lowering the temperature repeatedly from room temperature to 1,0000° C. and vice versa at a rate of 200° C./hour (the same will hold true for the following Examples).

The results given in Table 1 show that the composition (1) can suppress the increase of the leak.

TABLE 1

|  | Base tube | Leak after 1 cycle of rapid temperature raising and lowering | Leak after 15 cycles of rapid temperature raising and lowering |
| --- | --- | --- | --- |
| Composition (1) | CaO: 26.1 wt. % $ZrO_2$: 60.9 wt. % NiO: 13.0 wt. % | 3% | 3% |
| Prior Art | CaO: 30.0 wt. % $ZrO_2$: 70.0 wt. % | 3% | 28% |

Actions and Effects of Example 1-1

The composition of the invention can suppress cracks of an electrolyte during rapid raising and lowering of the temperature of a fuel battery, can reduce the leak after temperature raising and lowering, and can thus provide a reliable fuel battery.

As noted above, this composition can suppress the increase of the leak after rapid temperature raising and lowering.

Example 1-2

FIG. 1 shows an example in which a base tube (base material portion) 1 was formed from a porous tube comprising a composite material having a composition (2) indicated in Table 2.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm². Potentials obtained during the test were compared. The results are shown in Table 2. A fuel battery having the aforementioned base tube composition (1) was used as a reference.

The results given in Table 2 show that the composition (2) of the invention can broaden the range of selection of the material for the air-side electrode, and improve the potential, in addition to having the characteristics of the composition (1).

TABLE 2

|  | Base tube | Material for air-side electrode | Mean potential obtained (at 200 mA/cm²) |
| --- | --- | --- | --- |
| Composition (1) | CaO: 26.1 wt. % $ZrO_2$: 60.9 wt. % NiO: 13.0 wt. % | $La_{0.9}Sr_{0.1}MnO_3$ | 0.7 V |
| Composition (2) | CaO: 21.0 wt. % $ZrO_2$: 49.0 wt. % NiO: 30.0 wt. % | $La_{0.6}Sr_{0.4}MnO_3$ | 0.75 V |

Actions and Effects of Example 1-2

The composition (2) of the invention can broaden the range of selection of the material for the air-side electrode, increase the potential, and contribute to a lowered cost, in addition to having the actions of the composition (1).

In addition to exhibiting the effects of the composition (1), this composition can widen the range of selection of the material for the air-side electrode, and decrease the resistance on the air-side electrode side, thus increasing the resulting mean potential by 0.05 V.

Example 1-3

FIG. 1 shows an example in which a base tube (base material portion) 1 was formed from a porous tube comprising a composite material having a composition (3) indicated in Table 3.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

A comparison of the cost of the base tube was made. The results are shown in Table 3. A fuel battery having the aforementioned base tube composition (2) was used as a reference for the relative value of the cost of the base tube.

The results given in Table 3 show that the composition (3) of the invention not only has the characteristics of the composition (2), but can reduce the cost of the base tube.

TABLE 3

|  | Base tube | Cost of base tube (relative value) |
| --- | --- | --- |
| Composition (2) | CaO: 21.0 wt. % $ZrO_2$: 49.0 wt. % NiO: 30.0 wt. % | 100 |
| Composition (3) | CaO: 14.9 wt. % $ZrO_2$: 34.8 wt. % NiO: 50.3 wt. % | 80 |

Actions and Effects of Example 1-3

The composition (3) of the invention not only has the actions of the composition (2), but has a larger content of an inexpensive component. Thus, it can reduce the cost of the base tube materials, and consequently contribute to a lowered cost.

In addition to exhibiting the effects of the composition (2), this composition increases in the content of an inexpensive component, thus decreasing the materials cost of the base tube.

EXAMPLE 2

A base tube comprising a composite material having a CaO—$ZrO_2$—NiO three-component mixture (particle size of NiO: 5 μm or less.)

Example 2-1

FIG. 1 shows an example in which a base tube (base material portion) 1 was formed from a porous tube comprising a composite material having a composition (4) indicated in Table 4. Composition (4) was similar to composition (1) in its content, except that the NiO employed in composition (4) consisted of particles having a maximum particle size of 5 μm.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then its leaks before and after this test were compared. Fuel compositions capable of power generation using natural gas as a fuel were also compared.

The results are shown in Table 4. A fuel battery having the aforementioned base tube composition (1) (particle diameter: 10 μm), and a fuel battery having the base tube composition $CaO:30.0$ wt. $\%/ZrO_2:70.0$ wt. $\%$ according to the earlier technology were used as controls.

The results given in Table 4 show that the composition (4) causes no changes in the leak after rapid temperature raising and lowering, and can reduce the amount of steam added (S/C=steam/carbon) during use of natural gas.

TABLE 4

| | Base tube | Leak after 1 cycle of rapid temperature raising and lowering | Leak after 15 cycles of rapid temperature raising and lowering | Fuel composition capable of power generation |
|---|---|---|---|---|
| Composition (4) | CaO: 26.1 wt. %<br>$ZrO_2$: 60.9 wt. %<br>NiO: 13.0 wt. %<br>NiO particle size: 5 μm | 3% | 3% | S/C = 1.5 |
| Composition (1) | CaO: 26.1 wt. %<br>$ZrO_2$: 60.9 wt. %<br>NiO: 13.0 wt. % | 3% | 3% | S/C = 2.0 |
| Prior Art | CaO: 30.0 wt. %<br>$ZrO_2$: 70.0 wt. % | 3% | 28% | S/C = 2.0 |

Actions and Effects of Example 2-1

The composition of the invention can suppress cracks of an electrolyte during rapid raising and lowering of the temperature of a fuel battery, reduce the leak after temperature raising and lowering, and thus provide a reliable fuel battery. It can also decrease the amount of steam added when natural gas is used as a fuel.

As noted above, the composition (4) can suppress the increase of the leak after rapid temperature raising and lowering. It can also decrease the amount of steam added when natural gas is used as a fuel.

Example 2-2

FIG. 1 shows an example in which a base tube (base material portion) 1 was formed from a porous tube comprising a composite material having a composition (5) indicated in Table 5.

On the surface of the base tube 1, there were laminated a 100 μm thick fuel electrode-side electrode 2 comprising Ni-zirconia thermit, a 100 μm thick electrolyte 3 comprising YSZ, and a 100 μm thick air-side electrode 4 comprising $LaMnO_3$ doped with Sr in a proportion of 0.4. Further, a conductive connecting material 5 comprising $LaCrO_3$ was laminated for connecting the fuel electrode-side electrode 2 with the air-side electrode 4 to form a fuel cell, and the fuel cells were connected together to make a fuel battery.

The fuel battery was subjected to a power generation test under the conditions 200 $mA/cm^2$. Potentials obtained during the test were compared. Fuel compositions capable of power generation using natural gas as a fuel were also compared.

The results are shown in Table 5. A fuel battery having the aforementioned base tube composition (4) was used as a reference.

The results given in Table 5 show that the composition (5) of the invention can broaden the range of selection of the material for the air-side electrode, and improve the mean potential, in addition to having the characteristics of the composition (4).

TABLE 5

| Base tube | | Material for air-side electrode | Mean potential obtained (at 200 $mA/cm^2$) | Fuel composition capable of power generation |
|---|---|---|---|---|
| Composition (4) | CaO: 26.1 wt. %<br>$ZrO_2$: 60.9 wt. %<br>NiO: 13.0 wt. %<br>NiO particle size: 5 μm or less | $La_{0.9}Sr_{0.1}MnO_3$ | 0.7 V | S/C = 1.5 |
| Composition (5) | CaO: 21.0 wt. %<br>$ZrO_2$: 49.0 wt. %<br>NiO: 30.0 wt. %<br>NiO particle size: 5 μm or less | $La_{0.6}Sr_{0.4}MnO_3$ | 0.75 V | S/C = 1.5 |

Actions and Effects of Example 2-2

The composition (5) of the invention can broaden the range of selection of the material for the air-side electrode, increase the potential, and contribute to a lowered cost, in addition to having the actions of the composition (4).

In addition to exhibiting the effects of the composition (4), this composition can widen the range of selection of the material for the air-side electrode, and decrease the resistance on the air-side electrode side, thus increasing the mean potential.

Example 2-3

FIG. 1 shows an example in which a base tube (base material portion) 1 was formed from a porous tube comprising a composite material having a composition (6) indicated in Table 6.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The costs of the base tube were compared. The results are shown in Table 6. A fuel battery having the aforementioned base tube composition (5) was used as a reference for the relative value of the cost of the base tube.

The results given in Table 6 show that the composition (6) of the invention not only has the characteristics of the composition (5), but can reduce the cost of the base tube.

TABLE 6

| Base tube | | Cost of base tube (relative value) | Fuel composition capable of power generation |
|---|---|---|---|
| Composition (5) | CaO: 21.0 wt. %<br>ZrO$_2$: 49.0 wt. %<br>NiO: 30.0 wt. %<br>NiO particle size: 5 μm or less | 100 | S/C = 1.5 |
| Composition (6) | CaO: 14.9 wt. %<br>ZrO$_2$: 34.8 wt. %<br>NiO: 50.3 wt. %<br>NiO particle size: 5 μm or less | 80 | S/C = 1.5 |

Actions and Effects of Example 2-3

The composition (6) of the invention not only has the actions of the composition (5), but has a larger content of an inexpensive component. Thus, it can reduce the cost of the materials for the base tube, and consequently contribute to a lowered cost.

In addition to exhibiting the effects of the composition (5), this composition increases in the content of an inexpensive component, thus decreasing the materials cost of the base tube.

EXAMPLE 3

A base tube comprising a composite material having a CaO—ZrO$_2$—MgO three-component mixture Example 3-1

FIG. 1 shows an example in which a base tube (base material portion) 1 was formed from a porous tube comprising a composite material having a composition (7) indicated in Table 7.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 7. A fuel battery having the base tube composition CaO:30.0 wt. %/ZrO$_2$:70.0 wt. % according to the earlier technology was used as a control.

The results given in Table 7 show that the composition (7) can suppress the increase of the leak.

TABLE 7

| | Base tube | Leak after 1 cycle of rapid temperature raising and lowering | Leak after 15 cycles of rapid temperature raising and lowering |
|---|---|---|---|
| Composition (7) | CaO: 27.2 wt. %<br>ZrO$_2$: 63.6 wt. %<br>MgO: 9.2 wt. % | 2% | 2% |
| Prior Art | CaO: 30.0 wt. %<br>ZrO$_2$: 70.0 wt. % | 3% | 28% |

Actions and Effects of Example 3-1

The composition (7) of the invention can suppress cracks of an electrolyte during rapid raising and lowering of the temperature of a fuel battery, reduce the leak after temperature raising and lowering, and thus provide a reliable fuel battery.

As noted above, this composition can suppress the increase of the leak after rapid temperature raising and lowering.

Example 3-2

FIG. 1 shows an example in which a base tube (base material portion) 1 was formed from a porous tube comprising a composite material having a composition (8) indicated in Table 8.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 8. A fuel battery having the aforementioned composition (7) was used as a reference.

The results given in Table 8 show that the composition (8) of the invention can broaden the range of selection of the material for the air-side electrode, and improve the potential, in addition to having the characteristics of the composition (7).

TABLE 8

| | Base tube | Material for air-side electrode | Mean potential obtained (at 200 mA/cm$^2$) |
|---|---|---|---|
| Composition (7) | CaO: 27.2 wt. %<br>ZrO$_2$: 63.6 wt. %<br>MgO: 9.2 wt. % | La$_{0.9}$Sr$_{0.1}$MnO$_3$ | 0.7 V |
| Composition (8) | CaO: 22.9 wt. %<br>ZrO$_2$: 53.5 wt. %<br>MgO: 23.6 wt. % | La$_{0.6}$Sr$_{0.4}$MnO$_3$ | 0.74 V |

Actions and Effects of Example 3-2

The composition (8) of the invention can broaden the range of selection of the material for the air-side electrode, increase the potential, and contribute to a lowered cost, in addition to having the actions of the composition (7).

In addition to exhibiting the effects of the composition (7), this composition can widen the range of selection of the material for the air-side electrode, and decrease the resistance on the air-side electrode side, thus increasing the resulting mean potential by 0.04 V.

Example 3-3

FIG. 1 shows an example in which a base tube (base material portion) 1 was formed from a porous tube comprising a composite material having a composition (9) indicated in Table 9.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (8), which was used as a reference for the relative value of the cost of the base tube. The results are shown in Table 9.

The results given in Table 9 show that the composition (9) of the invention not only has the characteristics of the composition (8), but can reduce the cost of the base tube.

TABLE 9

|  | Base tube | Cost of base tube (relative value) |
|---|---|---|
| Composition (8) | CaO: 22.9 wt. % ZrO$_2$: 53.5 wt. % MgO: 23.6 wt. % | 100 |
| Composition (9) | CaO: 16.2 wt. % ZrO$_2$: 37.9 wt. % MgO: 45.9 wt. % | 60 |

Actions and Effects of Example 3-3

The composition (9) of the invention not only has the actions of the composition (8), but has a larger content of an inexpensive component. Thus, it can reduce the cost of the materials for the base tube, and consequently contribute to a lowered cost.

In addition to exhibiting the effects of the composition (8), this composition increases in the content of an inexpensive component, thus decreasing the materials cost of the base tube.

EXAMPLE 4

A base tube comprising a composite material having a CaO—ZrO$_2$—SrO three-component mixture Example 4-1

FIG. 1 shows an example in which a base tube (base material portion) 1 was formed from a porous tube comprising a composite material having a composition (10) indicated in Table 10.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 10. A fuel battery having the base tube composition CaO:30.0 wt. %/ZrO$_2$:70.0 wt. % according to the earlier technology was used as a control.

The results given in Table 10 show that the composition (10) can suppress the increase of the leak.

TABLE 10

|  | Base tube | Leak after 1 cycle of rapid temperature raising and lowering | Leak after 15 cycles of rapid temperature raising and lowering |
|---|---|---|---|
| Composition (10) | CaO: 27.4 wt. % ZrO$_2$: 63.9 wt. % SrO: 8.7 wt. % | 3% | 3% |
| Prior Art | CaO: 30.0 wt. % ZrO$_2$: 70.0 wt. % | 3% | 28% |

Actions and Effects of Example 4-1

The composition (10) of the invention can suppress cracks of an electrolyte during rapid raising and lowering of the temperature of a fuel battery, and suppress the increase of the leak after rapid temperature raising and lowering.

Example 4-2

FIG. 1 shows an example in which a base tube (base material portion) 1 was formed from a porous tube comprising a composite material having a composition (11) indicated in Table 11.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 11. A fuel battery having the aforementioned base tube composition (10) was used as a reference.

The results given in Table 11 show that the composition (11) of the invention can broaden the range of selection of the material for the air-side electrode, and improve the potential, in addition to having the characteristics of the composition (10).

TABLE 11

|  | Base tube | Material for air-side electrode | Mean potential obtained (at 200 mA/cm$^2$) |
|---|---|---|---|
| Composition (10) | CaO: 27.4 wt. % ZrO$_2$: 63.9 wt. % SrO: 8.7 wt. % | La$_{0.9}$Sr$_{0.1}$MnO$_3$ | 0.7 V |
| Composition (11) | CaO: 23.6 wt. % ZrO$_2$: 55.1 wt. % SrO: 21.3 wt. % | La$_{0.6}$Sr$_{0.4}$MnO$_3$ | 0.74 V |

Actions and Effects of Example 4-2

The composition (11) of the invention can broaden the range of selection of the material for the air-side electrode, increase the potential, and contribute to a lowered cost, in addition to having the actions of the composition (10).

In addition to exhibiting the effects of the composition (10), this composition can widen the range of selection of the material for the air-side electrode, and decrease the resistance on the air-side electrode side, thus increasing the resulting mean potential by 0.04 V.

Example 4-3

FIG. 1 shows an example in which a base tube (base material portion) 1 was formed from a porous tube comprising a composite material having a composition (12) indicated in Table 12.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (11), which was used as a reference for the relative value of the cost of the base tube. The results are shown in Table 12.

The results given in Table 12 show that the composition (12) of the invention not only has the characteristics of the composition (11), but can reduce the cost of the base tube.

TABLE 12

| Base tube | | Cost of base tube (relative value) |
|---|---|---|
| Composition (11) | CaO: 23.6 wt. %<br>$ZrO_2$: 55.1 wt. %<br>SrO: 21.3 wt. % | 100 |
| Composition (12) | CaO: 18.6 wt. %<br>$ZrO_2$: 43.4 wt. %<br>SrO: 38.0 wt. % | 75 |

Actions and Effects of Example 4-3

The composition (12) of the invention not only has the actions of the composition (11), but has a larger content of an inexpensive component. Thus, it can reduce the cost of the materials for the base tube, and consequently contribute to a lowered cost.

In addition to exhibiting the effects of the composition (11), this composition increases in the content of an inexpensive component, thus decreasing the materials cost of the base tube.

EXAMPLE 5

A base tube comprising a composite material having an $Al_2O_3$—MgO two-component mixture Example 5-1

FIG. 1 shows an example in which a base tube (base material portion) 1 was formed from a porous tube comprising a composite material having a composition (13) indicated in Table 13.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 13. A fuel battery having the base tube composition CaO:30.0 wt. %/$ZrO_2$:70.0 wt. % according to the earlier technology was used as a control.

The results given in Table 13 show that the composition (13) can suppress the increase of the leak.

TABLE 13

| | Base tube | Leak after 1 cycle of rapid temperature raising and lowering | Leak after 15 cycles of rapid temperature raising and lowering |
|---|---|---|---|
| Composition (13) | $Al_2O_3$: 52.1 wt. %<br>MgO: 47.9 wt. % | 3% | 3% |
| Prior Art | CaO: 30.0 wt. %<br>$ZrO_2$: 70.0 wt. % | 3% | 28% |

Actions and Effects of Example 5-1

The composition (13) of the invention can suppress cracks of an electrolyte during rapid raising and lowering of the temperature of a fuel battery, reduce the leak after temperature raising and lowering, and thus provide a reliable fuel battery.

As noted above, this composition can suppress the increase of the leak after rapid temperature raising and lowering.

Example 5-2

FIG. 1 shows an example in which a base tube (base material portion) 1 was formed from a porous tube comprising a composite material having a composition (14) indicated in Table 14.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm², and potentials obtained during the test were compared. The results are shown in Table 14. A fuel battery having the aforementioned base tube composition (13) was used as a reference.

The results given in Table 14 show that the composition (14) of the invention can broaden the range of selection of the material for the air-side electrode, and improve the potential, in addition to having the characteristics of the composition (13).

TABLE 14

| | Base tube | Material for air-side electrode | Mean potential obtained (at 200 mA/cm²) |
|---|---|---|---|
| Composition (13) | $Al_2O_3$: 52.1 wt. %<br>MgO:47.9 wt. % | $La_{0.9}Sr_{0.1}MnO_3$ | 0.7 V |
| Composition (14) | $Al_2O_3$:40.7 wt. %<br>MgO: 59.3 wt. % | $La_{0.6}Sr_{0.4}MnO_3$ | 0.75 V |

Actions and Effects of Example 5-2

The composition (14) of the invention can broaden the range of selection of the material for the air-side electrode in addition to having the actions of the composition (13), increase the potential, and contribute to a lowered cost.

In addition to exhibiting the effects of the composition (13), this composition can widen the range of selection of the material for the air-side electrode, and decrease the resistance on the air-side electrode side, thus increasing the resulting mean potential by 0.05 V.

Example 5-3

FIG. 1 shows an example in which a base tube (base material portion) 1 was formed from a porous tube comprising a composite material having a composition (15) indicated in Table 15.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (14), which was used as a reference for the relative value of the cost of the base tube. The results are shown in Table 15.

The results given in Table 15 show that the composition (15) of the invention not only has the characteristics of the composition (14), but can reduce the cost of the base tube.

TABLE 15

| Base tube | | Cost of base tube (relative value) |
|---|---|---|
| Composition (14) | $Al_2O_3$: 40.7 wt. % MgO: 59.3 wt. % | 100 |
| Composition (15) | $Al_2O_3$: 26.1 wt. % MgO: 73.9 wt. % | 80 |

Actions and Effects of Example 5-3

The composition (15) of the invention not only has the actions of the composition (14), but has a larger content of an inexpensive component. Thus, it can reduce the cost of the materials for the base tube, and consequently contribute to a lowered cost.

In addition to exhibiting the effects of the composition (14), this composition increases in the content of an inexpensive component, thus decreasing the materials cost of the base tube.

EXAMPLE 6

A base tube comprising a composite material having an $Al_2O_3$—MgO—CaO three-component mixture Example 6-1

FIG. 1 shows an example in which a base tube (base material portion) 1 was formed from a porous tube comprising a composite material having a composition (16) indicated in Table 16.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 16. A fuel battery having the base tube composition CaO:30.0 wt. %/$ZrO_2$:70.0 wt. % according to the earlier technology was used as a control.

The results given in Table 16 show that the composition (16) can suppress the increase of the leak.

TABLE 16

| Base tube | | Leak after 1 cycle of rapid temperature raising and lowering | Leak after 15 cycles of rapid temperature raising and lowering |
|---|---|---|---|
| Composition (16) | $Al_2O_3$: 55.3 wt. % MgO: 21.9 wt. % CaO: 22.8 wt. % | 2% | 2% |
| Prior Art | CaO: 30.0 wt. % $ZrO_2$: 70.0 wt. % | 3% | 28% |

Actions and Effects of Example 6-1

The composition (16) of the invention can suppress cracks of an electrolyte during rapid raising and lowering of the temperature of a fuel battery, reduce the leak after temperature raising and lowering, and thus provide a reliable fuel battery.

As noted above, this composition can suppress the increase of the leak after rapid temperature raising and lowering.

Example 6-2

FIG. 1 shows an example in which a base tube (base material portion) 1 was formed from a porous tube comprising a composite material having a composition (17) indicated in Table 17.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 17. A fuel battery having the aforementioned base tube composition (16) was used as a reference.

The results given in Table 17 show that the composition (17) of the invention can broaden the range of selection of the material for the air-side electrode, and improve the potential, in addition to having the characteristics of the composition (16).

TABLE 17

| Base tube | | Material for air-side electrode | Mean potential obtained (at 200 mA/cm$^2$) |
|---|---|---|---|
| Composition (16) | $Al_2O_3$: 55.3 wt. % MgO: 21.9 wt. % CaO: 22.8 wt. % | $La_{0.9}Sr_{0.1}MnO_3$ | 0.7 V |
| Composition (17) | $Al_2O_3$: 45.5 wt. % MgO: 18.0 wt. % CaO: 36.5 wt. % | $La_{0.6}Sr_{0.4}MnO_3$ | 0.73 V |

Actions and Effects of Example 6-2

The composition (17) of the invention can broaden the range of selection of the material for the air-side electrode, increase the potential, and contribute to a lowered cost, in addition to having the actions of the composition (16).

In addition to exhibiting the effects of the composition (16), this composition can widen the range of selection of the material for the air-side electrode, and decrease the resistance on the air-side electrode side, thus increasing the resulting mean potential by 0.03 V.

Example 6-3

FIG. 1 shows an example in which a base tube (base material portion) 1 was formed from a porous tube comprising a composite material having a composition (18) indicated in Table 18.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (17), which was used as a reference for the relative value of the cost of the base tube. The results are shown in Table 18.

The results given in Table 18 show that the composition (18) of the invention not only has the characteristics of the composition (17), but can reduce the cost of the base tube.

TABLE 18

| Base tube | | Cost of base tube (relative value) |
|---|---|---|
| Composition (17) | $Al_2O_3$: 45.5 wt. %<br>MgO: 18.0 wt. %<br>CaO: 36.5 wt. % | 100 |
| Composition (18) | $Al_2O_3$: 32.7 wt. %<br>MgO: 12.9 wt. %<br>CaO: 54.4 wt. % | 85 |

Actions and Effects of Example 6-3

The composition (18) of the invention not only has the actions of the composition (17), but has a larger content of an inexpensive component. Thus, it can reduce the cost of the materials for the base tube, and consequently contribute to a lowered cost.

In addition to exhibiting the effects of the composition (17), this composition increases in the content of an inexpensive component, thus decreasing the materials cost of the base tube.

EXAMPLE 7

A base tube comprising a composite material having an $Al_2O_3$—MgO—SrO three-component mixture Example 7-1

FIG. 1 shows an example in which a base tube (base material portion) 1 was formed from a porous tube comprising a composite material having a composition (19) indicated in Table 19.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 19. A fuel battery having the base tube composition CaO:30.0 wt. %/$ZrO_2$:70.0 wt. % according to the earlier technology was used as a control.

The results given in Table 19 show that the composition (19) can suppress the increase of the leak.

TABLE 19

| Base tube | | Leak after 1 cycle of rapid temperature raising and lowering | Leak after 15 cycles of rapid temperature raising and lowering |
|---|---|---|---|
| Composition (19) | $Al_2O_3$: 52.8 wt. %<br>MgO: 20.9 wt. %<br>SrO: 26.3 wt. % | 3% | 2% |
| Prior Art | CaO: 30.0 wt. %<br>$ZrO_2$: 70.0 wt. % | 3% | 28% |

Actions and Effects of Example 7-1

The composition (19) of the invention can suppress cracks of an electrolyte during rapid raising and lowering of the temperature of a fuel battery, reduce the leak after temperature raising and lowering, and thus provide a reliable fuel battery.

As noted above, this composition can suppress the increase of the leak after rapid temperature raising and lowering.

Example 7-2

FIG. 1 shows an example in which a base tube (base material portion) 1 was formed from a porous tube comprising a composite material having a composition (20) indicated in Table 20.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 20. A fuel battery having the aforementioned base tube composition (19) was used as a reference.

The results given in Table 20 show that the composition (20) of the invention can broaden the range of selection of the material for the air-side electrode, and improve the potential, in addition to having the characteristics of the composition (19).

TABLE 20

| Base tube | | Material for air-side electrode | Mean potential obtained (at 200 mA/cm$^2$) |
|---|---|---|---|
| Composition (19) | $Al_2O_3$: 52.8 wt. %<br>MgO: 20.9 wt. %<br>SrO: 26.3 wt. % | $La_{0.9}Sr_{0.1}MnO_3$ | 0.7 V |
| Composition (20) | $Al_2O_3$: 43.1 wt. %<br>MgO: 17.0 wt. %<br>SrO: 39.9 wt. % | $La_{0.6}Sr_{0.4}MnO_3$ | 0.76 V |

Actions and Effects of Example 7-2

The composition (20) of the invention can broaden the range of selection of the material for the air-side electrode, increase the potential, and contribute to a lowered cost, in addition to having the actions of the composition (19).

In addition to exhibiting the effects of the composition (19), this composition can widen the range of selection of the material for the air-side electrode, and decrease the resistance on the air-side electrode side, thus increasing the resulting mean potential by 0.06 V.

Example 7-3

FIG. 1 shows an example in which a base tube (base material portion) 1 was formed from a porous tube comprising a composite material having a composition (21) indicated in Table 21.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (20), which was used as a reference for the relative value of the cost of the base tube. The results are shown in Table 21.

The results given in Table 21 show that the composition (21) of the invention not only has the characteristics of the composition (20), but can reduce the cost of the base tube.

TABLE 21

| Base tube | | Cost of base tube (relative value) |
|---|---|---|
| Composition (20) | Al$_2$O$_3$: 43.1 wt. % MgO: 17.0 wt. % SrO: 39.9 wt. % | 100 |
| Composition (21) | Al$_2$O$_3$: 31.7 wt. % MgO: 12.5 wt. % SrO: 55.8 wt. % | 85 |

Actions and Effects of Example 7-3

The composition (21) of the invention not only has the actions of the composition (20), but has a larger content of an inexpensive component. Thus, it can reduce the cost of the materials for the base tube, and consequently contribute to a lowered cost.

In addition to exhibiting the effects of the composition (20), this composition increases in the content of an inexpensive component, thus decreasing the materials cost of the base tube.

EXAMPLE 8

A base tube comprising a composite material having an MgO—Al$_2$O$_3$—CaO—TiO$_2$ four-component mixture

Example 8-1

FIG. 1 shows an example in which a base tube (base material portion) 1 was formed from a porous tube comprising a composite material having a composition (22) indicated in Table 22.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 22. A fuel battery having the base tube composition CaO:30.0 wt. %/ZrO$_2$:70.0 wt. % according to the earlier technology was used as a control.

The results given in Table 22 show that the composition (22) can suppress the increase of the leak.

TABLE 22

| Base tube | | Leak after 1 cycle of rapid temperature raising and lowering | Leak after 15 cycles of rapid temperature raising and lowering |
|---|---|---|---|
| Composition (22) | MgO: 16.2 wt. % Al$_2$O$_3$: 40.9 wt. % CaO: 17.7 wt. % TiO$_2$: 25.2 wt. % | 2% | 2% |
| Prior Art | CaO: 30.0 wt. % ZrO$_2$: 70.0 wt. % | 3% | 28% |

Actions and Effects of Example 8-1

The composition (22) of the invention can suppress the increase of the leak after rapid temperature raising and lowering.

This composition can suppress cracks of an electrolyte during rapid raising and lowering of the temperature of a fuel battery, reduce the leak after temperature raising and lowering, and thus provide a reliable fuel battery.

Example 8-2

FIG. 1 shows an example in which a base tube (base material portion) 1 was formed from a porous tube comprising a composite material having a composition (23) indicated in Table 23.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 23. A fuel battery having the aforementioned base tube composition (22) was used as a reference.

The results given in Table 23 show that the composition (23) of the invention can broaden the range of selection of the material for the air-side electrode, and improve the potential, in addition to having the characteristics of the composition (22).

TABLE 23

| Base tube | | Material for air-side electrode | Mean potential obtained (at 200 mA/cm$^2$) |
|---|---|---|---|
| Composition (22) | MgO: 40.9 wt. % Al$_2$O$_3$: 16.2 wt. % CaO: 17.7 wt. % TiO$_2$: 25.2 wt. % | La$_{0.9}$Sr$_{0.1}$MnO$_3$ | 0.7 V |
| Composition (23) | MgO: 9.6 wt. % Al$_2$O$_3$: 24.3 wt. % CaO: 27.3 wt. % TiO$_2$: 38.8 wt. % | La$_{0.6}$Sr$_{0.4}$MnO$_3$ | 0.75 V |

Actions and Effects of Example 8-2

The composition (23) of the invention can broaden the range of selection of the material for the air-side electrode in addition to having the actions of the composition (22), increase the potential, and contribute to a lowered cost.

In addition to exhibiting the effects of the composition (22), this composition can widen the range of selection of the material for the air-side electrode, and decrease the resistance on the air-side electrode side, thus increasing the resulting mean potential by 0.05 V.

Example 8-3

FIG. 1 shows an example in which a base tube (base material portion) 1 was formed from a porous tube comprising a composite material having a composition (24) indicated in Table 24.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (23), which was used as a reference for the relative value of the cost of the base tube. The results are shown in Table 24.

The results given in Table 24 show that the composition (24) of the invention not only has the characteristics of the composition 3), but can reduce the cost of the base tube.

TABLE 24

| Base tube | | Cost of base tube (relative value) |
|---|---|---|
| Composition (23) | MgO: 9.6 wt. % Al$_2$O$_3$: 24.3 wt. % CaO: 27.3 wt. % TiO$_2$: 38.8 wt. % | 100 |
| Composition (24) | MgO: 1.6 wt. % Al$_2$O$_3$: 4.3 wt. % CaO: 38.8 wt. % TiO$_2$: 55.3 wt. % | 85 |

Actions and Effects of Example 8-3

The composition (24) of the invention not only has the actions of the composition (23), but has a larger content of an inexpensive component. Thus, it can reduce the cost of the materials for the base tube, and consequently contribute to a lowered cost.

In addition to exhibiting the effects of the composition (23), this composition increases in the content of an inexpensive component, thus decreasing the materials cost of the base tube.

EXAMPLE 9

A base tube comprising a composite material having an MgO—Al$_2$O$_3$—SrO—TiO$_2$ four-component mixture Example 9-1

FIG. 1 shows an example in which a base tube (base material portion) 1 was formed from a porous tube comprising a composite material having a composition (25) indicated in Table 25.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 25. A fuel battery having the base tube composition CaO:30.0 wt. %/ZrO$_2$:70.0 wt. % according to the earlier technology was used as a control.

The results given in Table 25 show that the composition (25) can suppress the increase of the leak.

TABLE 25

| | Base tube | Leak after 1 cycle of rapid temperature raising and lowering | Leak after 15 cycles of rapid temperature raising and lowering |
|---|---|---|---|
| Composition (25) | MgO: 13.3 wt. % Al$_2$O$_3$: 33.4 wt. % SrO: 30.1 wt. % TiO$_2$: 23.2 wt. % | 3% | 1% |
| Prior Art | CaO: 30.0 wt. % ZrO$_2$: 70.0 wt. % | 3% | 28% |

Actions and Effects of Example 9-1

The composition (25) of the invention can suppress cracks of an electrolyte during rapid raising and lowering of the temperature of a fuel battery, reduce the leak after temperature raising and lowering, and thus provide a reliable fuel battery.

As noted above, this composition can suppress the increase of the leak after rapid temperature raising and lowering.

Example 9-2

FIG. 1 shows an example in which a base tube (base material portion) 1 was formed from a porous tube comprising a composite material having a composition (26) indicated in Table 25.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 26. A fuel battery having the aforementioned base tube composition (25) was used as a reference.

The results given in Table 26 show that the composition (26) of the invention can broaden the range of selection of the material for the air-side electrode, and improve the potential, in addition to having the characteristics of the composition (25).

TABLE 26

| | Base tube | Material for air-side electrode | Mean potential obtained (at 200 mA/cm$^2$) |
|---|---|---|---|
| Composition (25) | MgO: 13.3 wt. % Al$_2$O$_3$: 33.4 wt. % SrO: 30.1 wt. % TiO$_2$: 23.2 wt. % | La$_{0.9}$Sr$_{0.1}$MnO$_3$ | 0.7 V |
| Composition (26) | Al$_2$O$_3$: 6.5 wt. % MgO: 16.3 wt. % SrO: 43.6 wt. % TiO$_2$: 33.6 wt. % | La$_{0.6}$Sr$_{0.4}$MnO$_3$ | 0.74 V |

Actions and Effects of Example 9-2

The composition (26) of the invention can broaden the range of selection of the material for the air-side electrode, increase the potential, and contribute to a lowered cost, in addition to having the actions of the composition (25).

In addition to exhibiting the effects of the composition (25), this composition can widen the range of selection of the material for the air-side electrode, and decrease the resistance on the air-side electrode side, thus increasing the resulting mean potential by 0.04 V.

EXAMPLE 10

A base tube comprising a composite material having an MgO—Al$_2$O$_3$—BaO—TiO$_2$ four-component mixture Example 10-1

FIG. 1 shows an example in which a base tube (base material portion) 1 was formed from a porous tube comprising a composite material having a composition (27) indicated in Table 27.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The rapid temperature raising and lowering of the fuel battery was repeated, and then changes in its leak were compared. The results are shown in Table 27. A fuel battery having the base tube composition CaO:30.0 wt. %/ZrO$_2$:70.0 wt. % according to the earlier technology was used as a control.

The results given in Table 27 show that the composition (27) can suppress the increase of the leak.

TABLE 27

| | Base tube | Leak after 1 cycle of rapid temperature raising and lowering | Leak after 15 cycles of rapid temperature raising and lowering |
|---|---|---|---|
| Composition (27) | MgO: 14.2 wt. % Al$_2$O$_3$: 36.2 wt. % BaO: 32.6 wt. % TiO$_2$: 17.0 wt. % | 3% | 2% |
| Prior Art | CaO: 30.0 wt. % ZrO$_2$: 70.0 wt. % | 3% | 28% |

Actions and Effects of Example 10-1

The composition (27) of the invention can suppress cracks of an electrolyte during rapid raising and lowering of the temperature of a fuel battery, reduce the leak after temperature raising and lowering, and thus provide a reliable fuel battery.

This composition can suppress the increase of the leak after rapid temperature raising and lowering.

Example 10-2

FIG. 1 shows an example in which a base tube (base material portion) 1 was formed from a porous tube comprising a composite material having a composition (28) indicated in Table 28.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The fuel battery was subjected to a power generation test under the conditions 200 mA/cm$^2$, and potentials obtained during the test were compared. The results are shown in Table 28. A fuel battery having the aforementioned composition (27) was used as a reference.

The results given in Table 28 show that the composition (28) of the invention can broaden the range of selection of the material for the air-side electrode, and improve the potential, in addition to having the characteristics of the composition (27).

TABLE 28

| | Base tube | Material for air-side electrode | Mean potential obtained (at 200 mA/cm$^2$) |
|---|---|---|---|
| Composition (27) | MgO: 14.2 wt. % Al$_2$O$_3$: 36.2 wt. % BaO: 32.6 wt. % TiO$_2$: 17.0 wt. % | La$_{0.9}$Sr$_{0.1}$MnO$_3$ | 0.7 V |

TABLE 28-continued

| | Base tube | Material for air-side electrode | Mean potential obtained (at 200 mA/cm$^2$) |
|---|---|---|---|
| Composition (28) | MgO: 8.3 wt. % Al$_2$O$_3$: 21.1 wt. % BaO: 46.4 wt. % TiO$_2$: 24.2 wt. % | La$_{0.6}$Sr$_{0.4}$MnO$_3$ | 0.74 V |

Actions and Effects of Example 10-2

The composition (28) of the invention can broaden the range of selection of the material for the air-side electrode, increase the potential, and contribute to a lowered cost, in addition to having the actions of the composition (27).

In addition to exhibiting the effects of the composition (27), this composition can widen the range of selection of the material for the air-side electrode, and decrease the resistance on the air-side electrode side, thus increasing the resulting mean potential by 0.04 V.

Example 10-3

FIG. 1 shows an example in which a base tube (base material portion) 1 was formed from a porous tube comprising a composite material having a composition (29) indicated in Table 29.

On the surface of the base tube 1, a fuel electrode-side electrode 2, an electrolyte 3, and an air-side electrode 4 were laminated, and a conductive connecting material 5 was further laminated. The compositions of these materials and the procedure used were the same as in Example 1-1. In this manner, a fuel battery was produced.

The cost of the base tube of the fuel battery was compared with that of a fuel battery having the aforementioned base tube composition (28), which was used as a reference for the relative value of the cost of the base tube. The results are shown in Table 29.

The results given in Table 29 show that the composition (29) of the invention not only has the characteristics of the composition (28), but can reduce the cost of the base tube.

TABLE 29

| | Base tube | Cost of base tube (relative value) |
|---|---|---|
| Composition (28) | MgO: 8.3 wt. % Al$_2$O$_3$: 21.1 wt. % BaO: 46.4 wt. % TiO$_2$: 24.2 wt. % | 100 |
| Composition (29) | MgO: 2.2 wt. % Al$_2$O$_3$: 5.8 wt. % BaO: 60.5 wt. % TiO$_2$: 31.5 wt. % | 85 |

Actions and Effects of Example 10-3

The composition (29) of the invention not only has the actions of the composition (28), but has a larger content of an inexpensive component. Thus, it can reduce the cost of the materials for the base tube, and consequently contribute to a lowered cost.

In addition to exhibiting the effects of the composition (28), this composition increases in the content of an inexpensive component, thus decreasing the materials cost of the base tube.

While the invention has been described with reference to the preferred embodiments, it is to be understood that various changes and modifications may be made without departing from the spirit and scope of the invention. All such modifications as would be obvious to one skilled in the art are intended to be included within the scope of the following claims.

What is claimed is:

1. A reformed fuel battery having a porous base tube comprised of a composition comprising a complex of 9.1–26.1 wt % CaO, 20.9–60.9 wt % $ZrO_2$ and 13.0–70.0 wt. % NiO.

2. A fuel battery according to claim 1, wherein the NiO is present in the form of granules having a particle size of 5 um.

3. The fuel battery according to claim 2, which is constituted by laminating a fuel electrode, an electrolyte and an air electrode on the surface of the porous base tube to thereby form a first cell, said first cell being duplicated by one or more additional cells, said cells being connected with one another in series.

4. A substrate material for a porous base tube of a fuel battery comprised of a multiplicity of cells connected in series, each such cell comprising a fuel electrode, an electrolyte and an air electrode laminated on the surface of the porous base tube, said substrate material comprising a complex of 9.1–26.1 wt. % CaO, 20.9–60.9 wt. % $ZrO_2$ and 13.0–70.0 wt % NiO, provided that the NiO is present in the form of granules having a particle size of 5 $\mu$m.

* * * * *